United States Patent
Cha et al.

(10) Patent No.: US 9,161,003 B2
(45) Date of Patent: Oct. 13, 2015

(54) TIME SYNCHRONIZATION APPARATUS AND METHOD

(71) Applicant: HANWHA TECHWIN CO., LTD., Changwon-si (KR)

(72) Inventors: Il Hwang Cha, Seoul (KR); Young Joon Park, Suwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 312 days.

(21) Appl. No.: 13/731,642

(22) Filed: Dec. 31, 2012

(65) Prior Publication Data

US 2013/0293709 A1 Nov. 7, 2013

(30) Foreign Application Priority Data

May 2, 2012 (KR) .................. 10-2012-0046361

(51) Int. Cl.
*H04N 7/18* (2006.01)
*H04N 9/79* (2006.01)
*H04N 5/77* (2006.01)
*H04N 5/781* (2006.01)
*H04N 9/82* (2006.01)

(52) U.S. Cl.
CPC . *H04N 9/79* (2013.01); *H04N 5/77* (2013.01); *H04N 5/781* (2013.01); *H04N 9/8205* (2013.01); *H04N 9/8211* (2013.01)

(58) Field of Classification Search
USPC ......................................................... 348/143
See application file for complete search history.

(56) References Cited

U.S. PATENT DOCUMENTS

| | | | | |
|---|---|---|---|---|
| 7,127,576 B1 * | 10/2006 | Riggs | ............................ | 711/162 |
| 2007/0216691 A1 * | 9/2007 | Dobrin | ............................ | 345/473 |
| 2008/0175275 A1 | 7/2008 | Garner et al. | | |
| 2011/0218397 A1 * | 9/2011 | Nishiyama et al. | ............ | 600/109 |
| 2011/0252265 A1 * | 10/2011 | Iwami et al. | ................. | 713/401 |
| 2012/0269204 A1 * | 10/2012 | Zampetti | ...................... | 370/503 |

FOREIGN PATENT DOCUMENTS

| | | | |
|---|---|---|---|
| JP | 2007282093 A | 10/2007 | |
| JP | 2007306497 A | 11/2007 | |
| JP | 2009296207 A | 12/2009 | |

* cited by examiner

*Primary Examiner* — Tracy Li
(74) *Attorney, Agent, or Firm* — Sughrue Mion, PLLC (57) ABSTRACT

Provided are a time synchronization apparatus and method for a network camera and a network video recorder (NVR) connected to the network camera. The apparatus includes: a data receiving unit receiving a data stream from the network camera, the data stream including timestamp information of the network camera; a noise determining unit determining whether time information input from the network camera is a noise based on a timestamp of the network camera contained in the timestamp information; and a setting control unit setting a timestamp of the NVR based on the determining of the noise determining unit, wherein the data stream comprises data obtained by the network camera and the timestamp information of the network camera which indicates a time when the data stream was transmitted from the network camera.

16 Claims, 7 Drawing Sheets

TIME SYNCHRONIZATION APPARATUS AND METHOD

This application claims priority from Korean Patent Application No. 10-2012-0046361 filed on May 2, 2012 in the Korean Intellectual Property Office, the disclosure of which is incorporated herein by reference in its entirety.

BACKGROUND

1. Field

Apparatuses and methods consistent with exemplary embodiments relate to time synchronization, and more particularly, to synchronizing a time of a network camera with a time of a network video recorder (NVR) by analyzing timestamps of image and audio frames received from the network camera and, when an expected timestamp is not received, correcting this problem.

2. Description of the Related Art

Image monitoring systems using surveillance cameras such as closed-circuit television (CCTV) and network systems that transmit image and audio data using networks are being rapidly disseminated. An image monitoring system or a network system registers a recording schedule to store image data obtained by a camera. When a user designates a hard disk to store the image data, the image data is stored in files in order of time on the designated hard disk. Then, when the designated hard disk is full, oldest data is removed from the hard disk, and new data is stored instead.

Here, an image system should be operated by synchronizing a timestamp of an NVR with timestamps contained in image and audio frames sent from multiple network cameras having different formats or times. To this end, the format diversity of time information input from a network camera, the difference in reference time, and errors of the time information should be corrected.

Until now, the difference between timestamps of image and audio frames received from a network camera and a timestamp of an NVR has been corrected simply by sensing a network jitter. In this case, however, an image system for image recording and event monitoring may have time errors due to temporary timestamp errors of frames generated by the camera or the timestamp difference between the camera and the NVR. These time errors may hinder the NVR from recording images or monitoring events at the right time.

SUMMARY

One or more exemplary embodiments provide a time synchronization apparatus and method for synchronizing a time of a network camera with a time of an NVR by analyzing timestamps of image and audio frames received from the network camera and, if an expected timestamp is not received, correcting this problem.

One or more exemplary embodiments also provide a time synchronization apparatus and method in which the sequence of images is identified based not just on times when image and/or audio information arrives from a network camera at an NVR, timestamps are generated in a sequence in which the images are captured by the network camera, and a time of the network camera is synchronized with a time of the NVR in view of network latency when a network environment is unstable.

However, the inventive concept is not restricted to the exemplary embodiments set forth herein. The above and other aspects will become more apparent to one of ordinary skill in the art to which the inventive concept pertains by referencing the detailed description given below.

According to an aspect of an exemplary embodiment, there is provided a time synchronization apparatus for synchronizing times of a network camera and an NVR connected to the network camera, the apparatus including: a data receiving unit receiving a data stream from the network camera, the data stream including timestamp information of the network camera; a noise determining unit determining whether time information input from the network camera is a noise based on a timestamp of the network camera contained in the timestamp information; and a setting control unit setting a timestamp of the NVR based on the determining of the noise determining unit, wherein the data stream comprises data obtained by the network camera and the timestamp information of the network camera which indicates a time when the data stream was transmitted from the network camera.

According to an aspect of another exemplary embodiment, there is provided a time synchronization method for synchronizing times of a network camera and a network video recorder (NVR) connected to the network camera, the method including: adjusting an offset between the network camera and the NVR; determining whether a noise is contained in a timestamp provided by the network camera; replacing the timestamp of the network camera with a new predicted timestamp, which is obtained based on time information of the network camera, if the noise is contained in the timestamp provided by the network camera, and obtaining a new offset by recalculating the offset or obtaining new network latency by checking network latency if the noise is not contained in the timestamp provided by the network camera; and resetting a timestamp of the NVR based on at least one of the predicted timestamp, the new offset, and the new network latency.

BRIEF DESCRIPTION OF THE DRAWINGS

The above and other aspects will become more apparent by describing in detail exemplary embodiments with reference to the attached drawings, in which.

DETAILED DESCRIPTION OF THE EXEMPLARY EMBODIMENTS

The inventive concept will now be described more fully hereinafter with reference to the accompanying drawings, in which exemplary embodiments are shown. This inventive concept may, however, be embodied in different forms and should not be construed as limited to the exemplary embodiments set forth herein. Rather, these embodiments are provided so that this disclosure will be thorough and complete, and will fully convey the scope of the inventive concept to those skilled in the art. The same reference numbers indicate the same components throughout the specification. In the attached figures, the thickness of layers and regions is exaggerated for clarity.

Unless defined otherwise, all technical and scientific terms used herein have the same meaning as commonly understood by one of ordinary skill in the art to which this inventive concept belongs. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

The exemplary embodiments will now be described in more detail with reference to the attached drawings.

Figure 1:
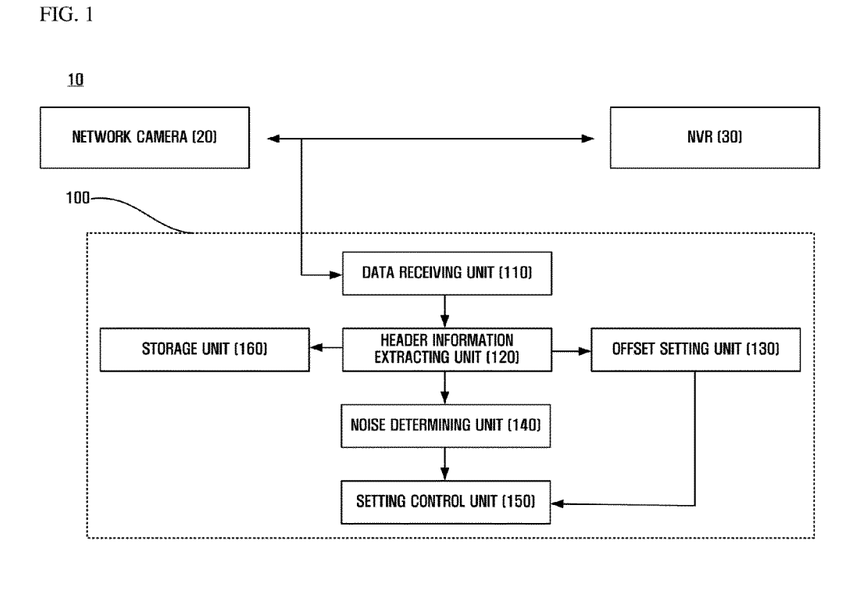
FIG. 1 is a block diagram of a time synchronization apparatus according to an exemplary embodiment.

FIG. 1 is a block diagram of a time synchronization apparatus 100 according to an exemplary embodiment.

The time synchronization apparatus 100 synchronizes times of a network camera 20 and a network video recorder (NVR) 30 included in an image system 10 by using timestamps. That is, the time synchronization apparatus 100 synchronizes a timestamp of the NVR 30 using a timestamp of the network camera 20. Specifically, the time synchronization apparatus 100 synchronizes times of the image system 10 by synchronizing the timestamp of the NVR 30 based on timestamps contained in image and audio frames sent from multiple network cameras 20 having different formats or times.

The time synchronization apparatus 100 may include a data receiving unit 110, a header information extracting unit 120, a noise determining unit 140, and a setting control unit 150. The time synchronization apparatus 100 may further include an offset setting unit 130 and a storage unit 160. The time synchronization apparatus 100 configured as described above has a function of correcting format diversity of time information received from the network camera 20, a difference in reference time, and errors of the time information. In addition, the time synchronization apparatus 100 has a function of checking network latency at predetermined intervals and correcting time information by applying the checking result.

The time synchronization apparatus 100 may be physically separated from the network camera 20 and the NVR 30 or may be included in the NVR 30 as a module. Generally, components of the time synchronization apparatus 100 are considered as an element of the image system 10. Thus, it will be obvious to those of ordinary skill in the art that each component of the time synchronization apparatus 100 can be located inside or outside the NVR 30 without any restriction.

The data receiving unit 110 receives data having a packetized elementary stream (PES) structure. The data having the PES structure includes data obtained by the network camera 20 and timestamp information of the network camera 20 which indicates a time when the obtained data was sent from the network camera 20. Here, a PES is a stream obtained by packetizing an elementary stream (ES) with an infinite length into variable lengths and repackaging the variable-length packets. The PES includes a packet header at the beginning thereof. The PES includes only one type of data (one source). The PES packet header includes an eight-bit stream identifier (ID) for identifying a source and further includes a timestamp to provide time information for synchronization.

The header information extracting unit 120 extracts header information, which includes the timestamp information of the network camera 20, from the data having the PES structure and received by the data receiving unit 110. The header information extracting unit 120 parses a header from the header information and extracts the timestamp information of the network camera 20 and other necessary information from the header.

The noise determining unit 140 determines whether time information input from the network camera 20 to the NVR 30 is a noise based on the timestamp contained in the header information. Here, the noise refers to temporarily invalid, noise-like time information input to the NVR 30. That is, the noise denotes a temporary time information error. The specific noise determination operation will be described later.

The setting control unit 150 resets or maintains a timestamp offset of the NVR 30 based on whether the noise determining unit 140 determines time information of image and audio data received by the NVR 30 as a noise. The specific operation of setting the timestamp of the NVR 30 will be described later.

The offset setting unit 130 compares currently input timestamp information of the network camera 20 with current time information of the NVR 30, and sets and adjusts an offset between the network camera 20 and the NVR 30 based on the comparison result. Here, the offset refers to a difference in reference time between the NVR 30 and the network camera 20. Generally, the offset may be set when the network camera 20 and the NVR 30 are reconnected to each other or when the time setting of the NVR 30 is changed or camera's time is changed.

The storage unit 160 stores the header information (which includes the timestamp information of the network camera 20) extracted by the header information extracting unit 120. In addition, the storage unit 160 may store various additional information and timestamp information related to the NVR 30.

The specific operation of the time synchronization apparatus 100 will now be described.

Figure 2A:
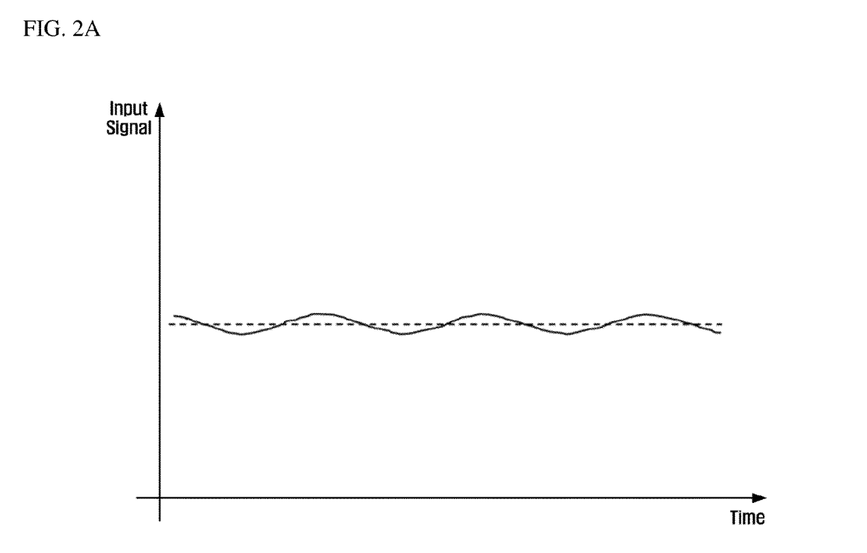
FIGS. 2A-2C are graphs of time information input to an image system.
Figure 2B:
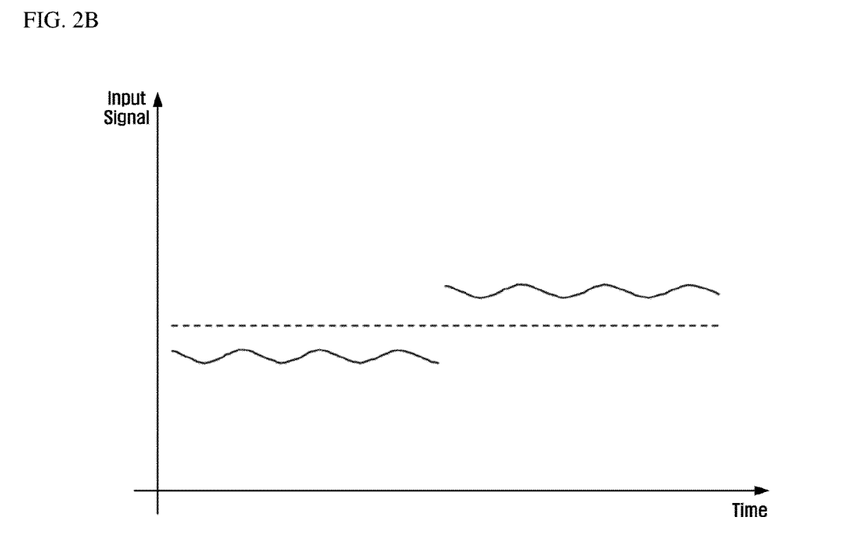
Figure 2C:
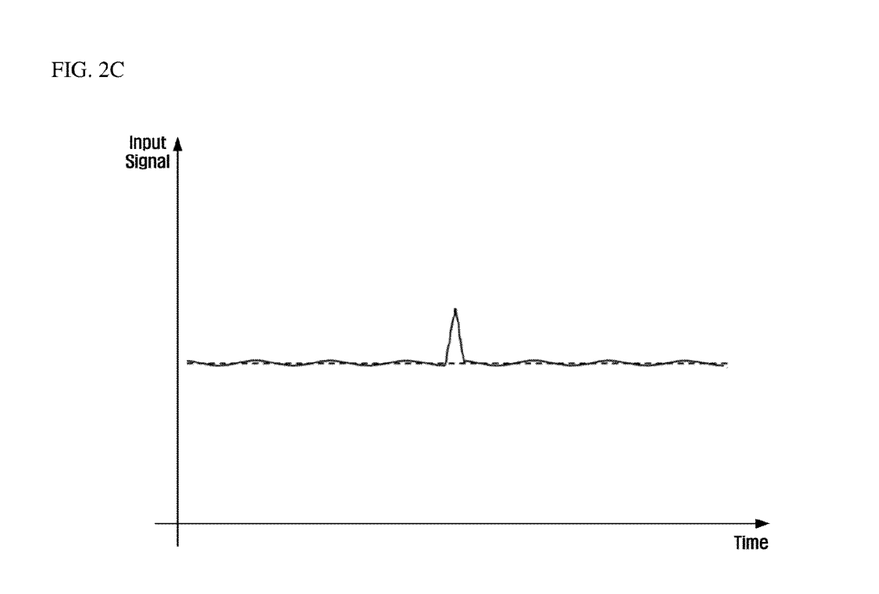
Figure 2D:
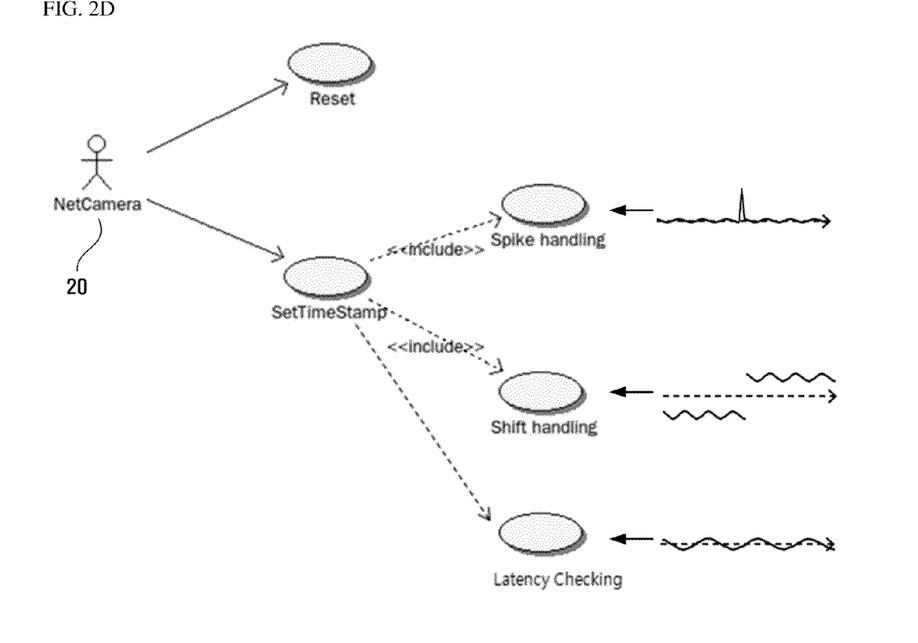
FIG. 2D is a diagram illustrating a process of setting a timestamp based on the time information of FIG. 2A, according to an exemplary embodiment.

FIGS. 2A-2C are graphs of time information input to the image system 10. FIG. 2D is a diagram illustrating a process of setting a timestamp based on the time information of FIGS. 2A-2C.

The format diversity of time information input from the network camera 20, the difference in reference time, and temporary errors of the time information are shown in Tables 1 and 2 below. Table 1 shows the types of timestamps, and Table 2 shows the formats of timestamps of the network camera 20.

TABLE 1

| Form | Description | Use |
| --- | --- | --- |
| Struct timeval | Time is represented with 32-bit information per second and 32-bit information per microsecond (one millionth of a second) | Used to handle time information with high resolution in Unix series |
| 90 kHz | Has a time resolution of 90000 Hz and is represented by one value | Used in PTS, DTS and SCR of MPEG stream, timestamp of RTP packet, etc. |
| 1 kHz | Has a resolution of a millisecond ($1/1000$) and is represented by one value | Used in VNP and SVNP |

TABLE 2

| Element | Description |
| --- | --- |
| VNP, SVNP | Has a time resolution of 1 kHz, and thus, represents time to $1/1000$ of a second |

TABLE 2-continued

| Element | Description |
|---|---|
| | Managed in 32 bits, and thus, overflow occurs every 49 days and 17 hours |
| SSNP | Provides 32-bit information per second in the form of time_t |
| | Information per 1/1000 of a second is sometimes provided additionally |
| RTSP | Has a time resolution of 90 kHz, and thus, represents time to 1/90000 of a second |
| | Managed in 32 bits, and thus, an overflow occurs every 13 hours |

Countermeasures to the format diversity of the time information input from the network camera 20, the difference in reference time, and the temporary errors of the time information (shown in Tables 1 and 2) should be applied to a design of the image system 10.

First of all, since a reference time indicated by time information of each image stream does not match a reference time of the NVR 30, it is required to match the reference times if the timestamp of each image stream is converted into a timestamp in a format of the NVR 30.

Next, synchronization is required to process temporary timestamp errors of frames generated by the network camera 20 or the difference between the timestamp of the network camera 20 and the timestamp of the NVR 30.

First, a reference value of a timestamp input from the network camera 20 may be changed. This change in reference time is referred to as a time shift. For example, if time information with a resolution of 90 kHz is represented in 32 bits without a sign, an overflow occurs at maximum of every 13 hours, 15 minutes and 21 seconds. A graph of an input signal corresponding to the time shift is shown in "Time Shift" of FIG. 2B.

Second, temporarily invalid, noise-like time information may be input. This temporary time information error is referred to as a time spike. A graph of an input signal corresponding to the time spike is shown in "Time Spike" of FIG. 2C.

Third, timestamps of frames may not be at regular intervals but may be at increasingly increased or reduced intervals. Here, if calculations are performed based only on the offset set in the NVR 30 of the image system 10, the timestamp of the NVR 30 may become different from the timestamp of the network camera 20. In addition, network latency may occur depending on the network environment. In this case, the accuracy of the offset is reduced. For example, frames may increasingly be delayed. Such a delay is referred to as network latency. A graph of an input signal corresponding to the network latency is shown in "N/W Latency" of FIG. 2A.

The time synchronization apparatus 100 statistically observes timestamps of image and audio frames received from the network camera 20. If an expected timestamp is not received, the time synchronization apparatus 100 corrects this problem. In addition, the time synchronization apparatus 100 identifies the sequence of images based not just on times when image and audio information arrives at the NVR 30 and generates timestamps in the sequence in which the images are captured by the network camera 20. Also, if the network environment is unstable, the time synchronization apparatus 100 performs calculations by taking network latency into consideration.

Referring to FIG. 2D, using timestamps received from the network camera 20, the time synchronization apparatus 100 may check network latency or process a time shift or a time spike. Accordingly, the timestamp of the NVR 30 can be set. This operation is defined as SetTimeStamp.

When the set time of the NVR 30 is changed or when data is received from the network camera 20 after a long break, initialization is performed. That is, when a new reference time needs to be set, a new offset may be set by comparing the currently input time information of the network camera 20 with the current time of the NVR 30. This reset operation is performed by the offset setting unit 130.

In the SetTimeStamp operation, the time synchronization apparatus 100 converts a time value (i.e., timestamp information) read from the network camera 20 into a timestamp in the format of the NVR 30 and records a result value in the PES header structure. The recorded value is set whenever a new audio and/or video frame is read from the network camera 20. In the timestamp conversion process, exceptional situations such as a time spike and a time shift are processed, and relative network latency between current and previous frames is processed.

Specifically, the noise determining unit 140 determines whether a time difference between currently input timestamp information and previously input timestamp information of the network camera 20 falls outside a threshold range. If the time difference falls outside the threshold range, the noise determining unit 140 determines the currently input timestamp information of the network camera 20 as a potential noise. After the noise determining unit 140 determines the currently input timestamp information as the potential noise, if the time difference between each subsequently input timestamp information of the network camera 20 and the previously input timestamp information continuously falls outside the threshold range at least for a predetermined time, the noise determining unit 140 determines the potential noise as a time shift which is not a noise. If not, the noise determining unit 140 determines the potential noise as a time spike which is a noise. If the noise determining unit 140 determines that the currently input timestamp information is not the potential noise, network latency should be checked periodically.

An input signal corresponding to network latency, a time shift, or a time spike should be processed based on the determination of the noise determining unit 140 about the timestamp information of the network camera 20.

A timestamp value of the NVR 30 according to an input signal corresponding to network latency, a time shift, or a time spike may be given by Equation (1) below.

$$TS_{NVR}TS_{Cam}+\text{Offset}+N/W\text{ Latency}, \quad (1)$$

where $TS_{NVR}$ is a timestamp value of the NVR 30, $TS_{Cam}$ is a timestamp value of the network camera 20, Offset is an offset value between the network camera 20 and the NVR 30, and N/W Latency is network latency.

The network latency may be given by Equation (2) below.

$$N/W\text{ Latency}=Cam_{Diff}-NVR_{Diff}, \quad (2)$$

where N/W Latency is network latency, $Cam_{Diff}$ is a difference between a current timestamp value and a previous timestamp value of the network camera 20, and $NVR_{Diff}$ is a difference between a timestamp value of a currently received frame of the NVR 30 and a timestamp value of a previously received frame of the NVR 30.

If the noise determining unit 140 determines that the currently input timestamp information of the network camera 20 is not a potential noise, the setting control unit 150 periodically checks network latency and obtains new network latency if the network latency occurs. Then, the setting control unit 150 resets the timestamp of the NVR 30 by adding the new network latency, the offset between the network camera 20 and the NVR 30, and the timestamp of the network camera 20.

If the noise determining unit 140 determines the currently input timestamp information of the network camera 20 as a time shift, the setting control unit 150 obtains a new offset by recalculating the offset between the network camera 20 and the NVR 30. Then, the setting control unit 150 resets the timestamp of the NVR 30 by adding the new offset, the timestamp of the network camera 20, and the network latency.

If the noise determining unit 140 determines the currently input timestamp information of the network camera 20 as a time spike, the setting control unit 150 replaces the timestamp of the network camera 20 with a value of a predicted timestamp. Here, the predicted timestamp is an estimated value obtained from time information values of the network camera 20 which are managed. If the predicted timestamp cannot be obtained, the timestamp of the NVR 30 is reset by replacing the current time value of the NVR 30 with the timestamp of the network camera 20. The predicted timestamp cannot be obtained if there are not enough time information samples needed to obtain the predicted timestamp. If the predicted timestamp is obtained, the setting control unit 150 resets the timestamp of the NVR 30 by adding the predicted timestamp, the offset between the network camera 20 and the NVR 30 and the network latency.

The time synchronization apparatus 100 processes time information immediately after the time information is input instead of delaying processing the time information using a buffer to determine the stability of the time information (to determine whether the time information is, e.g., a time spike). That is, the time synchronization apparatus 100 immediately processes time information of a currently input frame without waiting until a next frame is input. In addition, the time synchronization apparatus 100 ignores time information determined as an abnormal value and utilizes a statistically estimated value (a predicted timestamp). Since stream data is transmitted over the network, it may arrive at different times. Therefore, a latency value is reflected to minimize the effect of a jitter between arrival times of frames. Also, the time synchronization apparatus 100 statistically observes timestamps of frames. Thus, the NVR 30 does not determine whether to trust a timestamp of a frame sent from the network camera 20. Accordingly, a process of actually checking the time of the NVR 30 is minimized.

Figure 3:
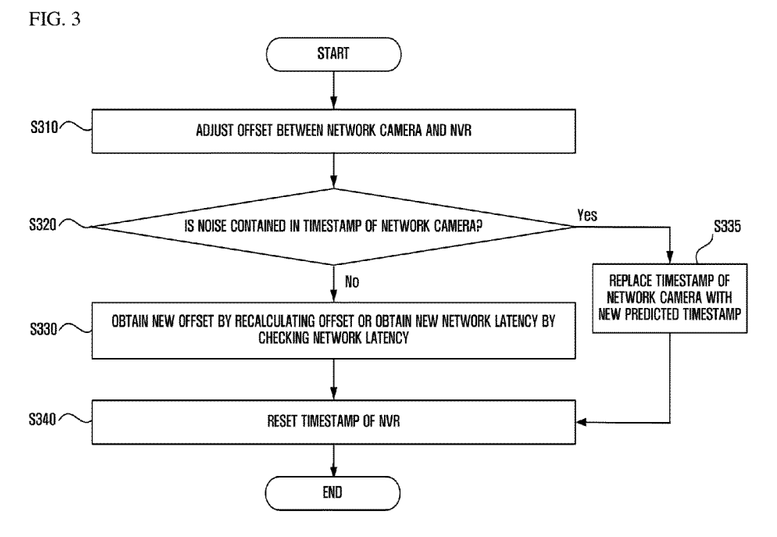
FIG. 3 is a flowchart illustrating a time synchronization method according to an exemplary embodiment.

FIG. 3 is a flowchart illustrating a time synchronization method of an image system in reference to FIG. 1, according to an exemplary embodiment.

In the time synchronization method of an image system according to the current embodiment, times of the network camera 20 and the NVR 30 included in the image system 10 are synchronized with each other using timestamps. To this end, an offset between the network camera 20 and the NVR 30 is adjusted (operation S310), and it is determined whether a timestamp sent from the network camera 20 contains a noise (operation S320). If the timestamp contains the noise (Yes), the timestamp of the network camera 20 is replaced with a new predicted timestamp (operation S335). When the timestamp does not contain the noise (No), a new offset is obtained by recalculating the offset, and/or new network latency is obtained by checking network latency (operation S330). Then, a timestamp of the NVR 30 is reset based on at least one of the predicted timestamp, the new offset, and the new network latency (operation S340).

Specifically, in operation S310, an initialization process for setting an offset by comparing currently input timestamp information of the network camera 20 with current time information of the NVR 30 is performed.

After the initialization process, if a time difference between the currently input timestamp information and previously input timestamp information of the network camera 20 falls outside a threshold range, it is determined in operation S320 that the currently input timestamp information of the network camera 20 is a potential noise. After the potential noise is input, if the time difference between each subsequently input timestamp information of the network camera 20 and the previously input timestamp information continuously falls outside the threshold range at least for a predetermined time, the potential noise is determined as a time shift which is not a noise. If not, the potential noise is determined as a time spike which is a noise. That is, it is determined whether a signal received from the network camera 20 is a time spike which is a noise, a time shift which is not a noise, or network latency.

When the currently input timestamp information of the network camera 20 is not the time spike or the time shift (that is, not the potential noise), new network latency is obtained by checking the network latency in operation S330. Then, in operation S340, the timestamp of the NVR 30 is reset by adding the new network latency, the offset, and the timestamp of the network camera 20.

If the currently input timestamp information of the network camera 20 is determined as the time shift, a new offset is obtained by recalculating the offset in operation S330. Then, in operation S340, the timestamp of the NVR 30 is reset by adding the new offset, the timestamp of the network camera 20, and the network latency.

If the currently input timestamp information of the network camera 20 is determined as the time spike, the timestamp of the network camera 20 is replaced with a value of a predicted timestamp in operation S335. Then, the timestamp of the NVR 30 is reset by adding the value of the predicted timestamp of the network camera 20, the offset, and the network latency in operation S340.

To reset the timestamp of the NVR 30, Equations (1) and (2) described above are used.

A procedure for resetting the timestamp of the NVR 30 will now be described with reference to FIGS. 4 and 5.

Figure 4:
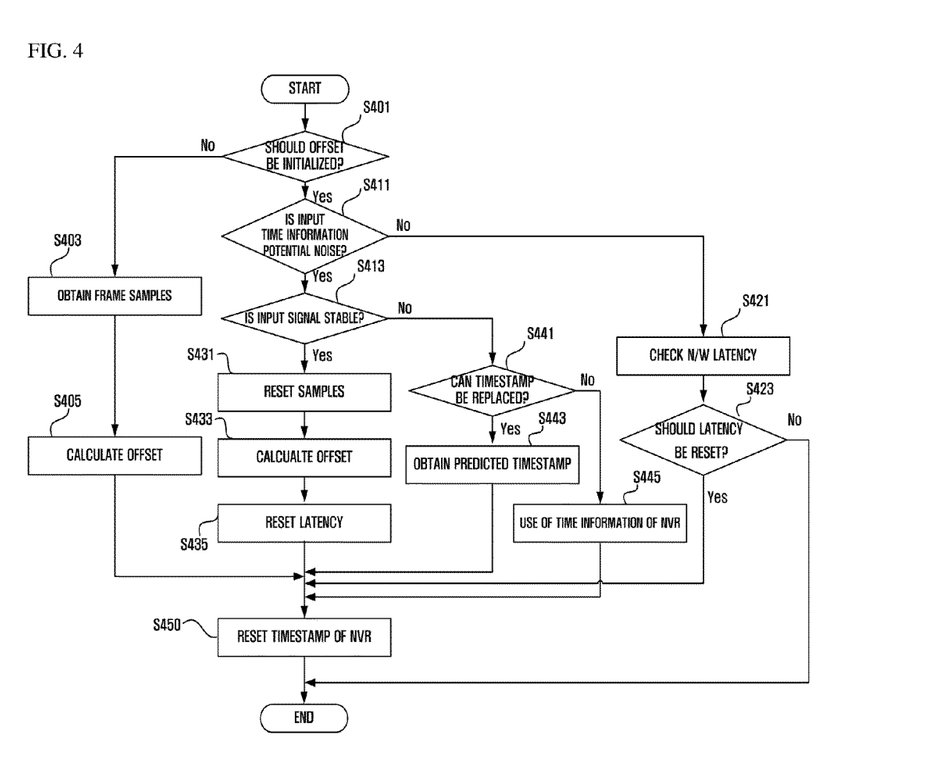
FIG. 4 is a detailed flowchart illustrating a timestamp setting operation based on the time information of FIGS. 2A-2C in the time synchronization method, according to an exemplary embodiment.

FIG. 4 is a detailed flowchart illustrating a timestamp setting operation based on the time information of FIGS. 2A-2C in the time synchronization method of an image system in reference to FIG. 1, according to an exemplary embodiment. FIG. 5 is a detailed flowchart illustrating a process of setting a timestamp by checking network latency during the timestamp setting operation of FIG. 4 in reference to FIG. 1, according to an exemplary embodiment.

Referring to FIG. 4, it is determined first whether an offset needs to be initialized (i.e., needs to be set) (operation S401). If it is determined that an offset needs to be initialized, a new offset is set by comparing currently input time information of the network camera 20 with a current time of the NVR 30. To this end, frame samples are obtained (operation S403), and then, a new offset is calculated (operation S405), and the timestamp of the NVR 30 is reset (operation S450).

If the offset does not need to be initialized and time information greatly different from previous time information is input, it is assumed that the input time information is a noise. That is, it is determined whether the input time information is a potential noise (operation S411).

If it is determined that the input time information is the potential noise, stability of subsequently input signals is determined (operation S413).

If it is determined that the input signals are stable, time information samples of the network camera 20 which are being managed are removed, and a new offset is set. Accordingly, a time shift can be processed. That is, new frame samples are obtained (operation S431), a new offset is calculated (operation S433), and network latency is initialized (operation S435). Then, the timestamp of the NVR 30 is reset (operation S450).

If it is determined that the input signals are not stable, a predicted timestamp is obtained from the managed time information values. Accordingly, a time spike can be processed. That is, if it is determined that the input signals are not stable, it is determined whether the timestamp of the network camera 20 can be replaced with a predicted timestamp (operation S441). If it is determined that the timestamp of the network camera 20 can be replaced with the predicted time stamp, the predicted timestamp is obtained (operation S443). Then, the timestamp of the NVR 30 is reset (operation S450). However, if it is determined that the timestamp of the network camera 20 cannot be replaced with the predicted timestamp, that is, when there are not enough time information samples for prediction, it is impossible to calculate an estimated value. Therefore, the timestamp of the NVR 30 is reset (operation S450) using the current time information of the NVR 30 as a timestamp (operation S445).

If it is determined that the input time information is not the potential noise, it is determined whether network latency needs to be reset (operation S423) by checking the network latency (operation S421). If it is determined that the network latency needs to be reset, that is, the network latency has changed, the timestamp of the NVR 30 is reset based on the changed latency (operation S450). If it is determined that the network latency does not need to be reset, that is, the network latency has not changed (i.e., is maintained), there is no need to reset the timestamp of the NVR 30. Thus, the timestamp setting operation is terminated without the resetting of the timestamp of the NVR 30.

Figure 5:
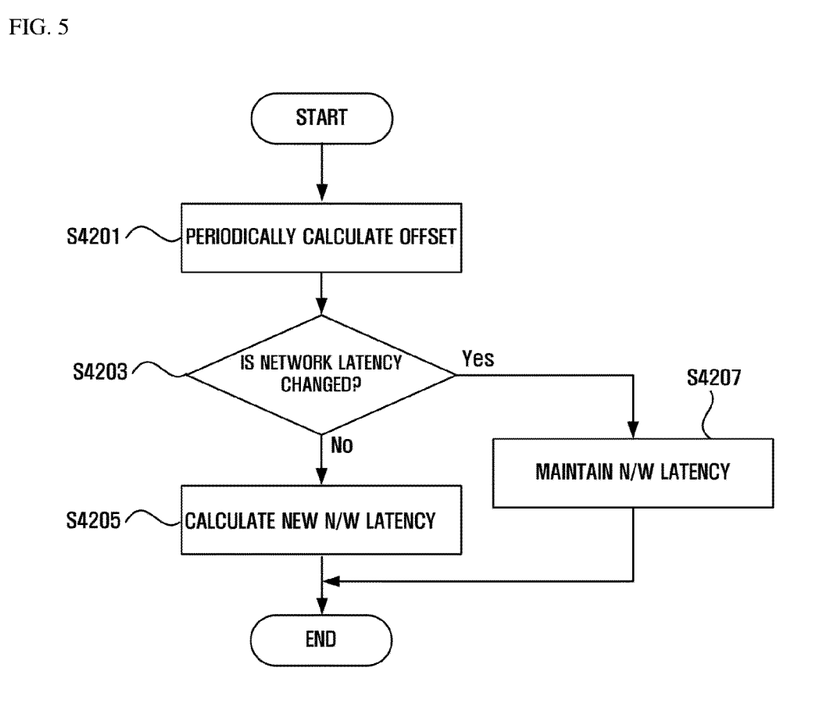
FIG. 5 is a detailed flowchart illustrating a process of setting a timestamp by checking network latency during the timestamp setting operation of FIG. 4, according to an exemplary embodiment.

Referring to FIG. 5, to check network latency (operation S421), it is determined whether an offset between the network camera 20 and the NVR 30 has changed by periodically calculating the offset (operation S4201). If it is determined that the network latency is changed, new network latency is calculated (operation S4205), and then, the timestamp of the NVR 30 is reset. If it is determined that the network latency is not changed, it means that the times of the image system 10 are in synchronization. Therefore, there is no need to reset the timestamp of the NVR 30, and the network latency is maintained (operation S4207). Here, Equation (2) described above is used to calculate the new network latency, and Equation (1) described above is used to reset the timestamp of the NVR 30.

Therefore, in the time synchronization method according to the current embodiment, the timestamp of the NVR 30 can be synchronized (with the timestamp of the network camera 20) despite the format diversity of time information input from the network camera 20, the difference in reference time, and errors of the time information. In addition, network latency is determined, and the time information of the NVR 30 is corrected accordingly.

According to the exemplary embodiments, a timestamp of an NVR can be synchronized using a timestamp of a network camera despite the format diversity of time information input from the network camera, the difference in reference time, and errors of the time information.

In addition, if a network environment is unstable, calculations are performed in view of network latency. This improves the accuracy of an offset between the network camera and the NVR, thereby synchronizing the timestamp of the NVR with the timestamp of the network camera.

Since calculations are performed using statistical information without retrieving the system time of the NVR, the amount of calculation required can be minimized.

In concluding the detailed description, those skilled in the art will appreciate that many variations and modifications can be made to the above exemplary embodiments without substantially departing from the principles of the inventive concept. Therefore, the exemplary embodiments are used in a generic and descriptive sense only and not for purposes of limitation.

What is claimed is:

1. A time synchronization apparatus for synchronizing of a network camera and a network video recorder (NVR) connected to the network camera, the apparatus comprising:
   a data receiving unit receiving a data stream from the network camera, the data stream comprising timestamp information of the network camera;
   a noise determining unit determining whether time information input from the network camera is a noise based on a timestamp of the network camera contained in the timestamp information; and
   a setting control unit setting a timestamp of the NVR based on the determining of the noise determining unit,
   wherein the data stream comprises data obtained by the network camera and the timestamp information of the network camera which indicates a time when the data stream was transmitted from the network camera,
   wherein the apparatus further comprises an offset setting unit setting and adjusting an offset, which is a difference in reference time between the NVR and the network camera, by comparing the timestamp information of the network camera which is currently input and current time information of the NVR, and
   wherein the noise determining unit:
   determines whether a time difference between the currently input timestamp information of the network camera and previously input timestamp information of the network camera falls outside a threshold range, determines the currently input timestamp information as a potential noise if the time difference falls outside the threshold range;
   determines the potential noise as a time shift, which is not a noise, if a time difference between each subsequently input timestamp information of the network camera and previously input timestamp information continuously falls outside the threshold range for a predetermined time after determining that the currently input timestamp information is the potential noise; and
   determines the potential noise as a time spike, which is a noise, if the time difference between the each subsequently input timestamp information of the network camera and the previously input timestamp information does not continuously fall outside the threshold range for the predetermined time after determining that the currently input timestamp information is the potential noise.

2. The apparatus of claim 1, wherein the setting control unit obtains network latency based on the determining of the noise determining unit, and resets the timestamp of the NVR by adding the network latency, the offset, and the timestamp of the network camera.

3. The apparatus of claim 1, wherein if the noise determining unit determines that the currently input timestamp information of the network camera is not the potential noise, the setting control unit obtains new network latency by periodically checking network latency.

4. The apparatus of claim 3, wherein the setting control unit resets the timestamp of the NVR by adding the new network latency, the offset, and the timestamp of the network camera.

5. The apparatus of claim 1, wherein if the noise determining unit determines the potential noise as the time shift, the setting control unit obtains a new offset by recalculating the offset.

6. The apparatus of claim 5, wherein the setting control unit resets the timestamp of the NVR by adding the new offset, the timestamp of the network camera, and the network latency.

7. The apparatus of claim 1, wherein if the noise determining unit determines the potential noise as the time spike, the setting control unit replaces the timestamp of the network camera with a predicted timestamp which is obtained based on time information of the network camera.

8. The apparatus of claim 7, wherein the setting control unit resets the timestamp of the NVR by adding the predicted timestamp, the offset between the network camera and the NVR, and the network latency.

9. The apparatus of claim 1, wherein the data stream comprises a header and a payload, and the header comprises the timestamp information of the network camera.

10. A time synchronization method for synchronizing times of a network camera and a network video recorder (NVR) connected to the network camera, the method comprising:
adjusting an offset between the network camera and the NVR;
determining whether a noise is contained in a timestamp provided by the network camera;
replacing the timestamp of the network camera with a new predicted timestamp, which is obtained based on time information of the network camera, if the noise is contained in the timestamp provided by the network camera, and obtaining a new offset by recalculating the offset or obtaining new network latency by checking network latency if the noise is not contained in the timestamp provided by the network camera; and
resetting a timestamp of the NVR based on at least one of the predicted timestamp, the new offset, and the new network latency,
wherein the adjusting the offset further comprises setting the offset by comparing currently input timestamp information of the network camera with current time information of the NVR, and
wherein the determining whether the noise is contained in the timestamp provided by the network camera comprises:
determining the currently input timestamp information of the network camera as a potential noise if a time difference between the currently input timestamp information of the network camera and previously input timestamp information of the network camera falls outside a threshold range;
determining the potential noise as a time shift, which is not a noise, if a time difference between each subsequently input timestamp information of the network camera and previously input timestamp information continuously falls outside the threshold range for a predetermined time after determining that the currently input timestamp information is the potential noise; and
determining the potential noise as a time spike, which is a noise, if the time difference between the each subsequently input timestamp information of the network camera and the previously input timestamp information does not continuously fall outside the threshold range for the predetermined time after determining that the currently input timestamp information is the potential noise.

11. The method of claim 10, wherein the obtaining the new network latency further comprises obtaining the new network latency by checking the network latency if it is determined that the currently input timestamp information of the network camera is not the potential noise.

12. The method of claim 11, wherein the resetting the timestamp of the NVR further comprises obtaining the timestamp of the NVR by adding the new network latency, the offset, and the timestamp of the network camera.

13. The method of claim 10, wherein the obtaining the new offset further comprises obtaining the new offset by recalculating the offset if the potential noise is determined as the time shift.

14. The method of claim 13, wherein the resetting the timestamp of the NVR further comprises obtaining the timestamp of the NVR by adding the new offset, the timestamp of the network camera, and the network latency.

15. The method of claim 10, wherein the replacing the timestamp of the NVR with the predicted timestamp comprises replacing the timestamp of the network camera with the predicted timestamp if the potential noise is determined as the time spike.

16. The method of claim 15, wherein the resetting the timestamp of the NVR comprises obtaining the timestamp of the NVR by adding the value of the predicted timestamp of the network camera, the offset, and the network latency.

* * * * *